United States Patent [19]

Wilhelm

[11] 4,407,326

[45] Oct. 4, 1983

[54] VALVE ACTUATING MECHANISM

[75] Inventor: Raymond L. Wilhelm, Orange, Calif.

[73] Assignee: Brunswick Corporation, Skokie, Ill.

[21] Appl. No.: 287,982

[22] Filed: Jul. 29, 1981

[51] Int. Cl.³ .................. F16K 37/00; F16K 31/44
[52] U.S. Cl. ................................... 137/553; 251/81; 251/134
[58] Field of Search .................. 137/553; 251/81, 134

[56] References Cited

U.S. PATENT DOCUMENTS 2,761,331  9/1956  Buescher .............................. 251/81

Primary Examiner—Alan Cohan
Assistant Examiner—John A. Rivell
Attorney, Agent, or Firm—William G. Lawler, Jr.; John R. Hoffman

[57] ABSTRACT

A valve actuating mechanism is disclosed and includes deactivating override means responsive to valve malfunction, such as sticking or binding of the valve. A drive motor is operatively connected through a drive train to a rotatable clutch housing. The clutch housing carries a clutch in the form of an open-ended ring spring. The clutch ring drives an output sleeve which is splined to an output shaft of the valve. The output shaft is rotatably fixed to a rotatable member which is effective to engage the clutch ring to disengage the ring from the clutch housing and effectively deactivate the drive train. The spline connection between the output sleeve and the output shaft comprises frangible means capable of being broken in the event the valve becomes stuck, whereby the output shaft, through the rotatable member, deactivates the drive train. The rotatable member also operates an indicating means whereby failure of the valve also is effective to preclude operation of the indicating means.

18 Claims, 6 Drawing Figures

VALVE ACTUATING MECHANISM

BACKGROUND OF THE INVENTION

This invention is directed to a valve actuating mechanism which includes valve position indicating means and deactivating means responsive to valve malfunction.

Heretofore, rotary valves, such as ball valves or the like, have been driven by rotary motors through drive train means which include spur, sun and planatary gears leading to a rotatable clutch housing. A clutch ring is carried by the rotatable clutch housing and is effective to drive an output shaft leading to the rotary valve. The output shaft is fixed for rotation with a moving means which is rotatable relative to the clutch housing. A rotatable member engages and moves a valve position indicator between angular stop positions. When the indicator reaches one of its stop positions, e.g. indicating open and closed positions of the valve, the indicator prohibits further movement of the rotatable member. The rotatable member, in turn, engages the clutch ring to disengage the clutch ring from the rotatable clutch housing and thereby deactivate the drive train. The valve position indicator also is connected through electrical switch means to the drive motor to shut-down the motor once the valve reaches one of its positions.

With such valve actuating mechanisms and valve position indicating means of the prior art, the position indicating means, i.e. position indicator switches, actually indicate actuator position and not the valve position. In other words, valve failure would not be detected by the position indicator switches because of their typical location in conjunction with the actuator. Most failures experienced were in the connection joint between the actuator and the valve. Since the position indicating switches were operative in conjunction with the actuator, failure of the valve itself was not indicated.

Attempts have been made to solve this problem by mounting position indicating switches directly on the valve. However, this approach requires running electrical wires externally from the valve to the actuator. Such wires are vulnerable to damage. Other attempts have been made to add an additional connector which significantly adds to the cost and weight of the mechanism.

The present invention is directed to providing a new and improved valve actuating mechanism, which may include valve position indicating means, and including override means in the output connection to the valve to deactivate the power means and valve position indicating means responsive to valve malfunction.

SUMMARY OF THE INVENTION

An object, therefore, of the present invention is to provide a new and improved valve actuating mechanism which solves the problems elicited above and which overcomes the deficiencies of the prior art.

In the exemplary embodiment of the present invention, a valve actuating mechanism includes valve position indicating means, along with deactivating means responsive to valve malfunction. Drive means is provided for moving the valve and includes power means, drive train means from the power means and operated thereby, and output means from the drive train means to the valve. Moving means, independent of the drive train means, moves the valve position indicating means in response to operation of the drive train means. The moving means is operatively associated with the output means to the valve. Clutch means is operatively associated between the drive train means, the output means, and the moving means for operating the output means and for deactivating the drive train means in response to the valve position indicating means reaching a predetermined indicating position and thereby stopping the moving means.

The invention contemplates override means in the output means to the valve, the override means being operatively associated with the clutch means. Thus, the override means deactivates the drive train means in response to malfunctioning of the valve and thereby prevent movement of the valve indicating means.

Structurally, the drive train means includes a rotatable clutch housing which carries an open-ended spring-type clutch ring. The moving means comprises a rotatable member fixed to an output shaft leading to the rotatable valve. The rotatable member performs three functions. First, it engages the valve position indicating means to move the indicating means angularly between stop limit positions, i.e. open and closed positions of the valve. Secondly, the rotatable member engages ears at the open ends of the clutch ring to disengage the ring from the rotatable clutch housing and thereby effectively deactivating the drive train means. Thirdly, the rotatable member is rotatably fixed to the valve itself and thereby effectively indicates valve position properly in conjunction with the valve position indicating means. Thus, if either the valve position indicating means reaches either of its stop limit positions, or if the valve output means itself is stopped, the rotatable member cannot rotate, whereupon it engages the clutch ring to disengage the clutch from the clutch housing and thereby deactivates the drive train.

The important feature of the present invention comprises the override means between the output means or shaft and the clutch means for deactivating the drive train means. This override means comprises a frangible connection in the output means. More particularly, the output means comprises drive shaft means rotatably fixed between the rotary valve and the rotatable member which engages the clutch ring. A sleeve surrounds the drive shaft means and is splined thereto forming the frangible means. The sleeve itself is driven by the clutch ring to rotate the valve between its open and closed positions. In the event that the valve becomes stuck, the spline connection between the drive shaft and the sleeve is broken. Thus, the sleeve no longer is operatively associated with the clutch ring. The drive shaft holds the rotatable member in fixed position for engagement with the clutch ring. With the valve and drive shaft stopped, the rotatable member disengages the clutch ring from the clutch housing and thereby deactivates the drive train means. With the rotatable member stopped, the valve position indicating means also cannot move, and, consequently, the valve position indicating means properly will indicate valve position and not actuator position as has been prevalent with the prior art.

Other objects, features and advantages of the invention will be apparent from the following detailed description taken in connection with the accompanying drawings.

DESCRIPTION OF THE DRAWINGS

The features of this invention which are believed to be novel are set forth with particularity in the appended claims. The invention, together with its objects and the advantages thereof, may be best understood by reference to the following description taken in conjunction with the accompanying drawings, in which like reference numerals identify like elements in the figures and in which:

DETAILED DESCRIPTION OF THE INVENTION

Figure 1:
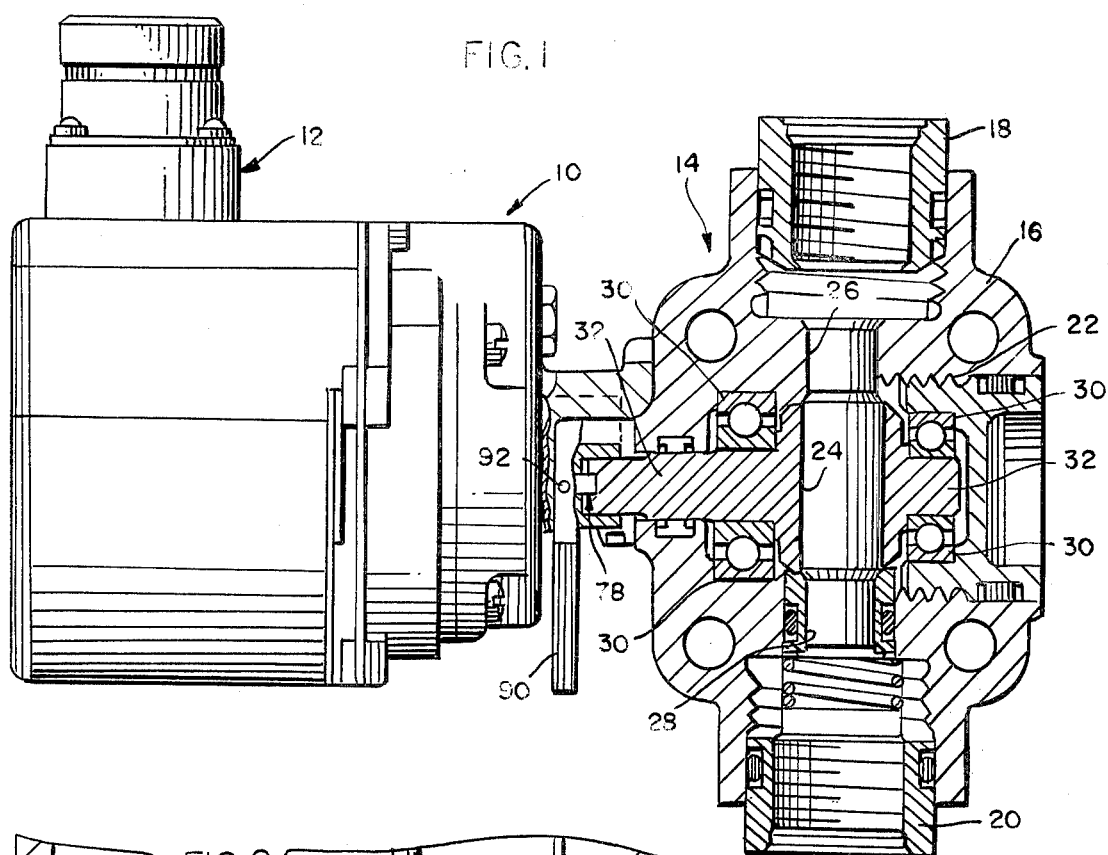
FIG. 1 is an elevational view of the valve actuating mechanism of the present invention, with the valve and valve housing in section.

Referring to the drawings in greater detail, and first to FIG. 1, a valve actuator, generally designated 10, includes power means in the form of a drive motor, generally designated 12, for operating a valve means, generally designated 14. Valve means 14 includes a valve housing 16 having ports 18 and 20 which may comprise inlet and outlet ports through the valve housing. A rotary valve 22 has a through passage 24 for communication with valve housing ports 26 and 28 which, in turn, are in communication with ports 18 and 20, respectively. The rotary valve is rotatable 90° between open (as shown) and closed positions. Bearings 30 are provided on opposite sides of the valve in support loading engagement with a valve shaft 32. The structure of rotary valve means 14 is generally conventional.

Figure 2:
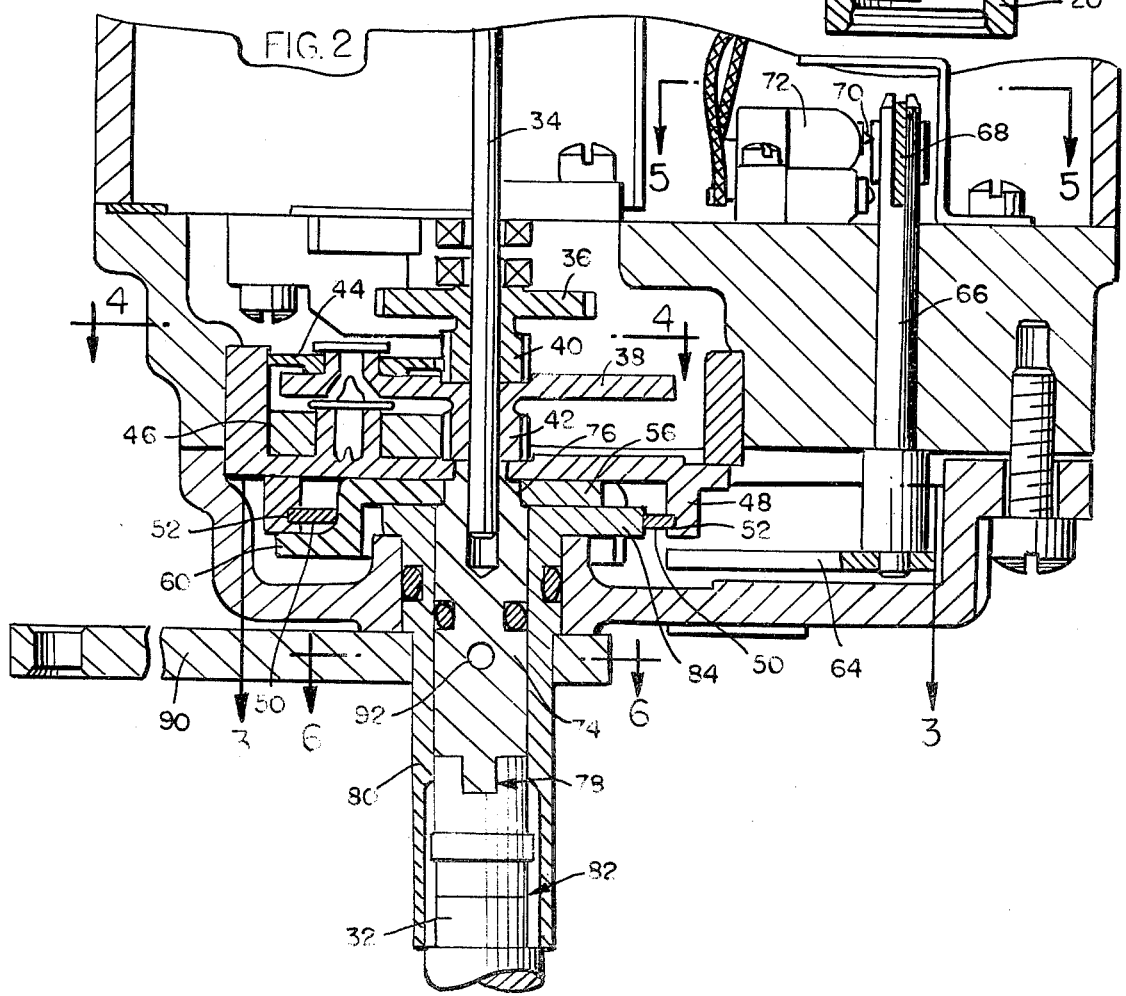
FIG. 2 is a fragmented, axial sectional view, on an enlarged scale, through the valve actuating means and output means of the present invention.
Figure 4:
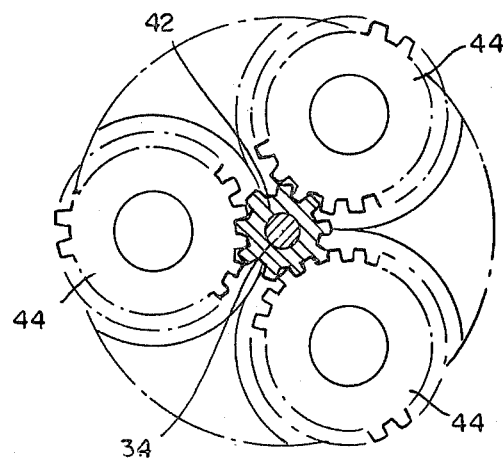
FIG. 4 is a sectional view taken generally along line 4—4 of FIG. 2.

Referring to FIG. 2, valve actuator 10 is shown in driving relationship with a drive shaft 34 leading from the power means in the form of motor 12. A conventional drive train, including spur gears 36 and 38, sun gears 40 and 42, and planetary gears 44 and 46 are effective to rotate a clutch housing 48. FIG. 4 shows a sectional view illustrating drive shaft 34, sun gear 40 and planetary gears 44.

Figure 3:
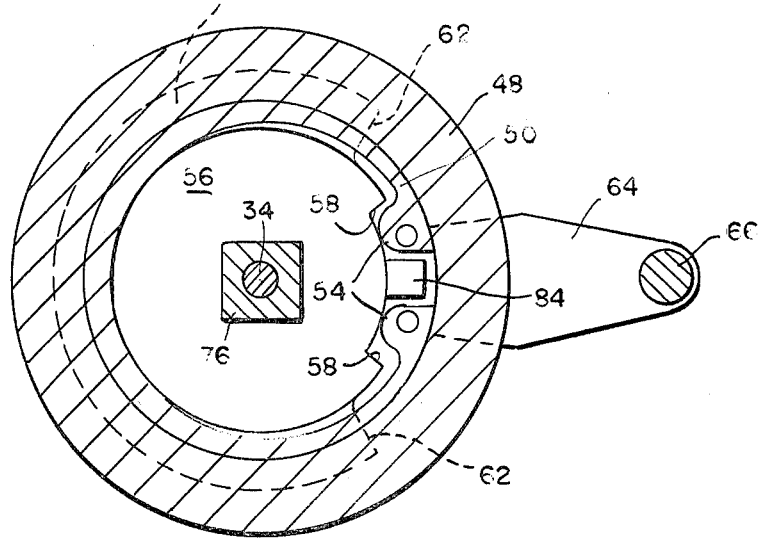
FIG. 3 is a sectional view taken generally along line 3—3 of FIG. 2.

At this point, it would be best to refer to both FIG. 3 in conjunction with FIG. 2. In particular, rotatable clutch housing 48 carries an open-ended spring-type clutch ring 50 which is carried by the clutch housing within groove 52 (FIG. 2). Clutch ring 50 has a pair of radially inwardly directed ears 54 (FIG. 3).

Moving means in the form of a rotatable member 56 is disposed substantially within clutch housing 48 and is rotatable relative thereto. The rotatable member has a pair of inner opposed shoulders 58 for engaging ears 54 of clutch ring 50. The rotatable member also has a circumferential flange 60 defining a second pair of outer opposed shoulders 62 for engaging an arm 64 of the valve position indicating means described hereinafter.

Thus, rotatable member 56 is effective to both disengage the clutch means as well as operate the valve position indicating means. In particular, when valve position indicating arm 64 reaches a stop limit position, i.e. open and closed positions of the valve as described hereinafter, arm 64 will engage one of the shoulders 62 and cause rotatable member 56 to stop. When stopped, one of shoulders 58 of the rotatable member will engage one of the ears 54 of clutch ring 50 and draw the clutch ring out of its frictional engagement within slot 52 of clutch housing 48. This releases the clutch and effectively deactivates the drive train to the drive motor described above.

Figure 5:
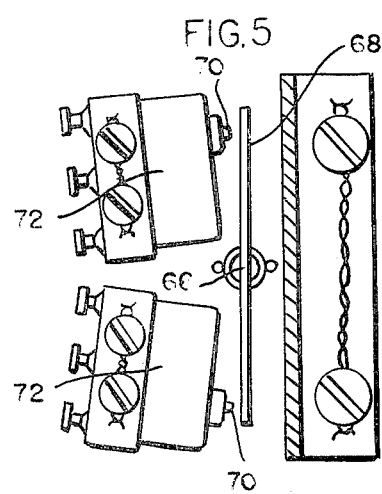
FIG. 5 is a sectional view taken generally along line 5—5 of FIG. 2.

Referring to FIGS. 2, 3 and 5, actuator arm 64 is connected through a rod 66 to a switch blade 68 at the opposite end of the rod. The blade is engageable with switch buttons 70 of limit switches 72 in either extreme positions of the valve actuating means. The limit switches are electrically coupled to appropriate valve position indicating means, for instance at a control station. The switches are also electrically coupled to motor 12 to shut-off the motor once the actuator arm 64 and, as described hereinafter, the valve 22 reaches one of its positions.

Referring back to FIGS. 1-3, the output means, including the novel override means, of the present invention now will be described. More particularly, the output means includes a first drive shaft portion 74 which is rotatably fixed to rotatable member 56 by a square shaft portion 76 (FIG. 3). Drive shaft portion 74 is rotatably fixed to valve shaft 32 by a tongue and groove means, generally designated 78 (FIGS. 1 and 2). There is sufficient spacing in the tongue and groove means to prevent binding within the connection.

The output means, including the override means, of the present invention also includes a sleeve 80 surrounding drive shaft 74 and valve shaft 32 in the area of the tongue and groove connection 78. The sleeve is splined to valve shaft 32 by a spline connection 82. The sleeve has a tab 84 (see particularly FIG. 3) which protrudes radially outwardly between ears 54 of clutch ring 50. Thus, rotation of clutch ring 50 by the drive train from motor 12 is effective to rotate valve 22 between its open and closed positions. As described above, once the valve reaches either of its positions, actuator arm 64 will engage rotatable member 56 to disengage the clutch ring and deactivate the drive train.

However, an important feature of the invention is the construction of spline connection 82 between sleeve 80 and valve shaft 32. This spline connection is constructed to comprise frangible means capable of being broken in the event valve 22 becomes stuck because of malfunctioning of the valve means. Once the spline connection becomes broken, there is no longer an operative association between sleeve 80 and clutch ring 50. However, there still remains a rigid drive connection between the valve to rotatable member 56, through valve shaft 32 and output shaft portion 74. Consequently, should the valve become stuck, rotatable member 56 cannot rotate. Should an operator energize motor 12, one of the shoulders 58 of rotatable member 56, depending on the valve position, will engage one of the ears 54 of clutch ring 50 and prevent any effective drive from the motor. Thus, it can be seen that if the valve malfunctions and becomes stuck, rotatable member 56 will not rotate actuator arm 64 and, consequently, no shift in valve position will be indicated.

From the foregoing, it is apparent that a new and improved valve actuating mechanism has been provided in conjunction with a valve indicating means whereby all driving connections to the valve indicating means is deactivated or overridden in response to valve malfunctioning.

Figure 6:
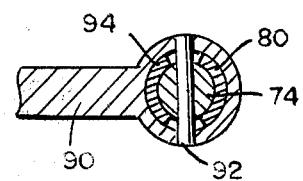
FIG. 6 is a sectional view taken generally along line 6—6 of FIG. 2.

Lastly, it should be noted that a conventional manual operating lever 90 (FIGS. 1 and 2) is rotatably fixed to valve portion 74 by means of a pin 92. An appropriate lost motion circumferential groove 94 (FIG. 6) is provided in sleeve 80 in order to manually rotate valve 22 through output shaft portion 74 and valve shaft 32, independently of sleeve 80. This manual operation also is effective to hold or move rotatable member 56 which is effective to rotate indicator arm 64 leading to the valve position indicating means.

It will be understood that the invention may be embodied in other specific forms without departing from the spirit or central characteristics thereof. The present examples and embodiments, therefor, are to be considered in all respects as illustrative and not restrictive, and the invention is not to be limited to the details given herein.

What is claimed is:

1. A valve actuating mechanism including value position indicating means, comprising:
    drive means for moving said valve including power means, drive train means from said power means and operated thereby, and output means from said drive train means to said valve;
    valve position indicating means;
    moving means for moving said valve position indicating means in response to operation of said drive train means, said moving means being operatively associated with said output means;
    clutch means operatively associated between said drive train means and said output means and said moving means for operating said output means and for deactivating said drive train means in response to said valve position indicating means reaching a predetermined indicating position and thereby stopping said moving means; and
    override means in said output means operatively associated with said clutch means through said moving means for deactivating said drive train means in response to malfunctioning of said valve and thereby prevent movement of said valve indicating means.

2. The mechanism of claim 1 wherein said moving means is operatively associated between said clutch means and valve position indicating means.

3. The mechanism of claim 1 wherein said output means includes a first portion establishing a direct drive between said moving means and said valve, a second portion interconnected between said clutch means and said first portion, whereby said first and second portions operate in unison with said moving means and said clutch means during normal movement of the valve.

4. The mechanism of claim 3 wherein the interconnection between said first and second portions of said output means comprises frangible means capable of being broken in the event the valve becomes stuck, whereby the valve itself, through said first portion, holds said moving means to thereby engage said clutch means, deactivate said drive train means and prevent movement of said valve indicating means.

5. The mechanism of claim 4 wherein said first portion comprises a drive shaft and said second portion comprises a sleeve surrounding and splined to said drive shaft with the spline forming said frangible means.

6. A valve actuating mechanism including deactivating means responsive to valve malfunction, comprising:
    drive means for moving said valve including power means, drive train means from said power means and operated thereby, and output means from said drive train means to said valve;
    clutch means operatively associated between said drive train means and said output means;
    moving means operatively associated between said output means and said clutch means for engaging the clutch means and deactivating said drive train means in response to stopping said moving means; and
    override means in said output means for disengaging the output means from said clutch means, through said moving means, and stopping said moving means in response to malfunctioning of said valve, thereby deactivating said drive train means.

7. The mechanism of claim 6 wherein said output means includes a first portion establishing a direct drive between said moving means and said valve, a second portion interconnected between said clutch means and said first portion, whereby said first and second portions operate in unison with said moving means and said clutch means during normal movement of the valve.

8. The mechanism of claim 7 wherein the interconnection between said first and second portions of said output means comprises frangible means capable of being broken in the event the valve becomes stuck, whereby the valve itself, through said first portion, holds said moving means to thereby engage said clutch means and deactivate said drive train means.

9. The mechanism of claim 8 wherein said first portion comprises a drive shaft and said second position comprises a sleeve surrounding and splined to said drive shaft with the spline forming said frangible means.

10. The mechanism of claim 8 including lost motion means between said first and second portions of said output means.

11. A rotary valve actuating mechanism including deactivating means responsive to valve malfunction, comprising:
    drive train means including a rotatable clutch support member with clutch means supported thereby;
    a clutch engaging member mounted for rotation independently of said clutch support member and for engaging the clutch means to deactivate said drive train means in response to stopping said clutch engaging member;
    first output means interconnected between said clutch engaging member and the rotary valve;
    second output means engageable by said clutch means and interconnected to said first output means for rotating the valve in response to rotation of said clutch support member; and
    override means between said first and second output means for disengaging said second output means from said clutch means and stopping said clutch engaging member in response to malfunctioning of said valve, thereby causing the clutch engaging member to engage the clutch means and deactivate said drive train means.

12. The mechanism of claim 11 wherein said override means is in the interconnection between said first and second output means.

13. The mechanism of claim 12 wherein said interconnection comprises frangible means capable of being broken in the event the rotary valve becomes stuck, whereby the valve itself, through said first output means, holds said clutch engaging member to thereby engage said clutch means and deactivate said drive train means.

14. The mechanism of claim 13 wherein said first output means comprises a drive shaft and said second output means comprises a sleeve surrounding and splined to said drive shaft with the spline forming said frangible means.

15. The mechanism of claim 14 including pin-and-slot lost motion means between said drive shaft and said sleeve, the pin being in said drive shaft and the slot being in said sleeve, and including a manual operating lever secured to said shaft by means of said pin.

16. The mechanism of claim 11 including valve position indicating means operable by said clutch engaging member whereby said valve position indicating means is coupled to said valve through said first output means independently of said second output means.

17. The mechanism of claim 16 including means for stopping said valve position indicating means upon reaching a predetermined valve position and thereby stopping said clutch engaging member to deactivate said drive train means.

18. The mechanism of claim 11 including manual operating means secured to said first output means independently of said second output means.

* * * * *